United States Patent [19]

Chu et al.

[11] 4,381,260
[45] Apr. 26, 1983

[54] AROMATIC CHROMOPHORIC SUBSTITUTED POLYSILOXANE DYES

[75] Inventors: Nan S. Chu, Hartsdale; Lawrence Marlin, Yorktown Heights, both of N.Y.

[73] Assignee: Union Carbide Corporation, Danbury, Conn.

[21] Appl. No.: 284,388

[22] Filed: Jul. 17, 1981

[51] Int. Cl.³ .................. C09B 5/42; C09B 39/00; A23L 1/27; A61K 47/00
[52] U.S. Cl. .................. 260/144; 260/153; 260/154; 260/372; 260/378; 544/198; 544/303; 424/226; 424/256; 426/540
[58] Field of Search .............. 260/153, 154, 205, 206, 260/207, 207.1, 207.3, 207.5, 372, 378, 144; 544/198, 503

[56] References Cited

U.S. PATENT DOCUMENTS

| | | | |
|---|---|---|---|
| 2,925,313 | 2/1960 | Bailey et al. | 260/205 X |
| 2,927,839 | 3/1960 | Bailey et al. | 260/205 X |
| 2,931,693 | 4/1960 | Bailey et al. | 260/207 X |
| 2,934,459 | 4/1960 | Canovai | 260/206 X |
| 2,957,744 | 10/1960 | Bailey et al. | 260/207 X |
| 2,963,338 | 12/1960 | Bailey et al. | 260/153 X |
| 4,189,429 | 2/1980 | Lambert | 260/207.5 |

*Primary Examiner*—Floyd D. Higel
*Attorney, Agent, or Firm*—Paul W. Leuzzi

[57] ABSTRACT

Polymeric dyes of the present invention have the formula:

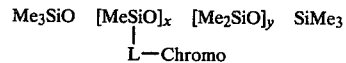

wherein Me represents the methyl group, x can range from 2 to 100, y can range from 20 to 300, and the ratio of x:y is at least 1:10 and is preferably from 1:5 to 1:1. The symbol L represents the divalent group which connects the chromophoric moiety and the polysiloxane moiety together by covalent bonds. L is conveniently a saturated divalent aliphatic group which connects the silicon atom to the chromophoric group by a non-hydrolyzable covalent bond. Chromo represents an aromatic chromophore which imparts color to the polymer molecule. The polmeric dyes of the present invention can be used to dye natural fibers such as silk, wool, and cotton and to color plastics such as nylon, Dynel, Acrilan, acetate, and viscore. In addition, the polymeric dyes can also be used as a food dye when water soluble groups are present (e.g., on the chromophores) to impart water solubility to the polymeric dye. Because of the stability and the high molecular weight of these polymeric dyes, they can be used as colorants for food as well as in pharmaceutical and cosmetic applications.

9 Claims, No Drawings

AROMATIC CHROMOPHORIC SUBSTITUTED POLYSILOXANE DYES

BACKGROUND OF THE INVENTION

1. Field of the Invention

This invention relates to dyes which comprise conventional chromophores covalently linked to polysiloxane polymers.

2. Description of the Prior Art

U.S. Pat. Nos. 2,925,313, 2,934,459, 2,957,744 and 2,963,338 describe the preparation of polysiloxane dyestuffs. The polysiloxane dyestuffs are characterized by containing at least two hydrolyzable groups per chain. Since the molecular weight of the polymeric dyes depend on the extent of the hydrolysis of the hydrolyzable group, it would be difficult to control the molecular weight of the polymeric dyes as they are made. The presence of the hydrolyzable group in the polymeric dye may also lead to undesirable properties when the polymeric dye is used under various environments.

SUMMARY OF THE INVENTION

This invention provides polysiloxane polymers which have been modified by chemically attaching chromophoric bodies to their backbones. The resulting coloring agents possess chemical and physical inertness which makes them especially suitable for food, drug, and cosmetic applications.

DESCRIPTION OF THE PREFERRED EMBODIMENTS

Polymeric dyes of the present invention have the formula:

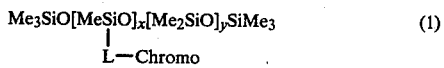  (1)

wherein Me represents the methyl group, x can range from 2 or below to 100 or more, y can range from 20 or below to 300 or more, and the ratio of x:y can be 1:10 or greater and is preferably from 1:5 to 1:1. The symbol L represents the divalent group which connects the chromophoric moiety and the polysiloxane moiety together by covalent bonds. L is conveniently a saturated divalent aliphatic group which connects the silicon atom to the chromophoric group by a non-hydrolyzable covalent bond. Chromo represents an aromatic chromophore which imparts color to the polymer molecule.

One class of compounds particularly suitable for forming the linking group L is represented as $CH_2=CH(CH_2)_nX$ (2) wherein n is an integer of from 0–10 and more preferably in the range of 1 to 4 and X represents $-NH_2$, $-NHR$ (R=alkyl), and $-OH$ or groups such as $-CN$, halide, epoxy, ester, and the like which can be further converted to amino or hydroxyl groups. Addition of a terminal olefinic double bond to Si-H is well described in the literature and the reaction can be used to bond starting compound (2) to a hydrosiloxane. The functional group X gives a convenient site for the subsequent attachment of the intermediate addition product so formed to chromophores. Alternately, the chromophore can be attached to a silane by similar reactions prior to siloxane equilibration.

To form the chromophoric moiety, Chromo in formula (1), any type of aromatic dye molecules which can be covalently bonded to the polysiloxane polymer can be used. For example, the chromophore moiety may be derived from anthrone, including anthraquinone and arthrapyridone, dyes or from azo-dyes, provided the dye contains or is modified to contain a suitable functional group for reaction with the functional group (e.g. X in formula (2)) of the linking group already on the modified polysiloxane polymer. For instance, the various commercially available fiber reactive dyes such as Procion, Cibacron, Ramazol, Reacton, Drimaren, Levafix, Reactofil, Primagin and the like, all contain a reactive group which is well known to be able to undergo nucleophilic displacement by a hydroxyl or an amino group or an activated C=C bond which is able to add to a hydroxyl or an amino group of a fiber. These dyes when used for the present invention, would react with the hydroxyl or amino groups (X group) on the polysiloxane intermediate to give a polysiloxane dye.

Alternatively, the chromophore can have a functional group which can be hydrosilated for direct production without any intermediate being needed.

The molecular weight of the polymeric dye of this invention can range from a few hundred to over fifty thousand. For practical reasons, e.g., viscosity, a molecular weight in the range of 1000 to 10,000 will generally be preferred. In addition to hydrosiloxane starting materials corresponding to the linear polysiloxane moiety in formula (I) above, conceptually any polysiloxane which contains Si-H bonds but has no hydrolyzable group, for instance those of the formula

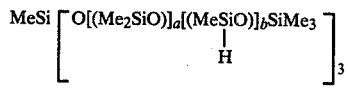

could be used to form the polysiloxane moiety of the polymeric dyes of the invention.

The polymeric dyes represented by formula (1) can be obtained by reacting a silicone fluid of the formula

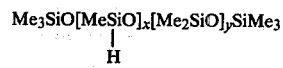

with a compound having the formula (2) or other linkage precursor systems. One useful approach is to react the Si-H containing fluid with allyl glycidyl ether and then to react the product with an amine such as N-methylaniline or ethylene diamine to provide an intermediate to which the chromophore can be attached. When N-methylaniline is used, the product can be coupled with a diazonium salt to yield an azo dye. When ethylene diamine is used, the product can be reacted with a halo derivative of an anthrone (e.g., an anthrone or anthrapyridone) to yield a polymeric dye with an anthrone chromophore.

Yet another alternate preparation starts with a cyclic silicone, e.g., of the formula

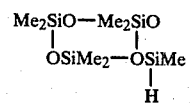

which can be reacted with a linkage precursor, e.g., allyl amine, and then equilibrated with an appropriate amount of an end-blocker compound of the formula Me₃SiOSiMe₃. This procedure is exemplified below in Example VI.

The polymeric dyes of the present invention can be used to dye natural fibers such as silk, wool, and cotton temperature overnight. The red precipitate was filtered and purified once by dissolving the polymeric dye in water and than salted out with NaCl. The polymeric dye was an orange-red powder of the formula:

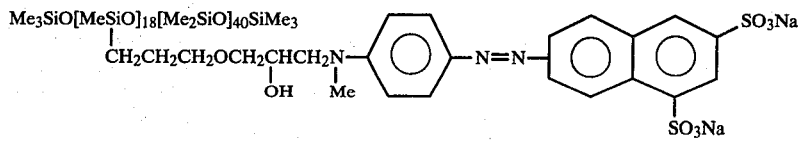

and to color plastics such as nylon, Dynel, Acrilan, acetate, and viscose. The large molecule of the polymeric dye may prevent the migration of the color to the surface of the colored articles. In addition, the polymeric dyes can also be used as a food dye when water soluble groups are present (e.g., on the chromophores) to impart water solubility to the polymeric dye. Water soluble polysiloxane dyes made by the present invention were found to be compatible with food (such as gelatin). Because of the stability and the high molecular weight of these polymeric dyes, they can be used as colorants for food as well as in pharmaceutical and cosmetic applications.

EXAMPLE I

Forty grams of a polymer of the formula:

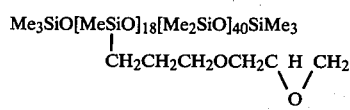

were heated with 17 grams of N-methylaniline under nitrogen at 126°–128° C. for five hours. Solvent and unreacted N-methylaniline were removed in a rotary vacuum evaporator under vacuum (less than 1 mmHg) at 95° C. The residue left was washed twice with a 40–60 mixture of ethanol-H₂O. The oil separated was dissolved in ether and the ethereal solution washed twice with water and dried over anhydrous Na₂SO₄. Ether was removed, and the viscous oil obtained weighed 42.4 grams. The polymeric product had the formula:

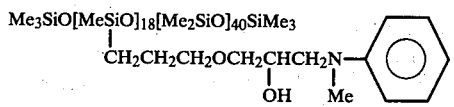

Two grams of this polymeric product were mixed with 10 milliliters of distilled water and hydrochloric acid was added dropwise until a slightly turbid solution was obtained. It was kept in an ice bath. One and twenty-seven one hundreths of a gram of the monosodium salt of 2-aminonaphthalene-6,8-disulfonic acid was diazotized in the usual manner and added to the above chilled solution. The coupling mixture was stirred in an ice-bath and sodium acetate (1.56 g in 8 ml distilled water) added. Acetone (30 ml) was also added to keep the partially coupled polymer in solution. The mixture was stirred 45 minutes in the ice-bath and 1.5 hours at room temperature. At the end of the reaction, a dark red solution was obtained. The solution was neutralized with concentrated NaOH solution to pH 7.5. Acetone was removed under reduced pressure and the aqueous solution left was allowed to stand at room A 200 ppm solution of the product gave an orange-red color at pH 4–7.5. The polymeric dye (200 ppm) when used in lieu of FD&C red No. 2 in gelatin, gave a completely clear orange-red product just as the one made with the FD&C red No. 2 color.

EXAMPLE II

A procedure analogous to that used in Example I was followed, except that the diazonium salt was made from sulfonilic acid. The polymeric dye was an orange powder and the infrared spectrum of the product was consistent with the structure:

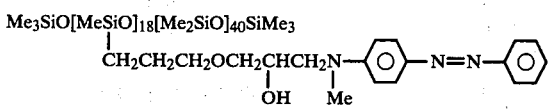

The color of the polymeric dye is dependant on its concentration in solution. At 200 ppm, it is bright orange, while at 50 ppm it is bright yellow. The polymeric dye was found to be completely compatible with gelatin when used as the coloring agent.

EXAMPLE III

Ten grams of a polymer of the formula:

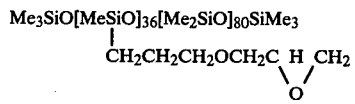

were mixed with 20 milliliters of ethylenediamine under nitrogen. The mixture was stirred at room temperature until a homogeneous solution was obtained (about 45 minutes). The solution was then heated at refluxing temperature for 1.5 hours. Excess diamine was removed under reduced pressure in a rotary evaporator. Trace amounts of the diamine was removed by dissolving the residue in a mixture of ethanol-H₂O and vacuum distilling off the solvent. The process was repeated twice. The residue finally obtained was dried at about 10 mmHg at 60° C. Yield: 10.2 g of a polymeric product of the formula:

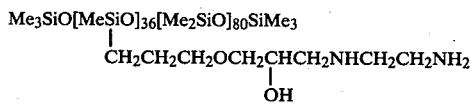

Two grams of this polymeric product and 40 milliliters of ethanol were added to a round bottom flask. The mixture was stirred under nitrogen until a solution was obtained. To this solution were added a solution made by mixing 60 milliliters of distilled water with 2.2 grams of a compound of the formula:

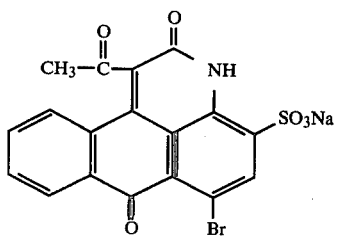

and 0.8 gram of sodium carbonate and 0.2 gram of a copper catalyst. Both the 1,9-anthrapyridone compound and the copper catalyst were prepared according to a known procedure (*Chemical Abstracts,* 43:8165, 1949). The mixture was heated on a steam bath and the reaction was followed by thin layer chromatography. During the heating, the color of the mixture changed from orange-yellow to deep red indicating the replacement of the bromo by the amino groups.

When the reaction was completed, the mixture was cooled and filtered. Solvent in the filtrate was removed under reduced pressure. The residue left was redissolved in 70 milliliters distilled water and the polymeric dye salted out with sodium chloride. It had the formula:

The polymeric dye when dried was a dark purple powder with a metallic shine. The polymeric dye (200 ppm) when dissolved in water, gave a clear violet-red solution.

EXAMPLE IV

A procedure analogous to that used in Example III was followed, except that the chromophore used was the sodium salt of 1-amino-4-bromoanthraquinone-2-sulfonic acid. The polymeric dye obtained, which was blue, had the formula:

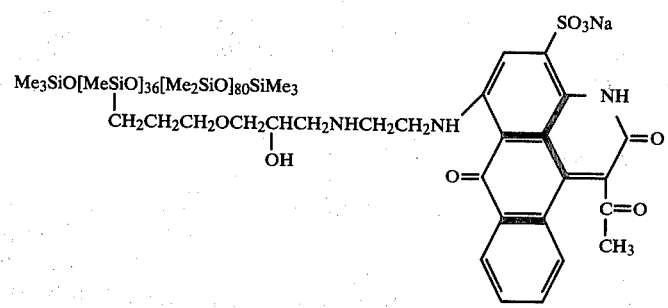

EXAMPLE V

A procedure analogous to that used in Example III was followed, except that the chromophore used was a compound of the formula:

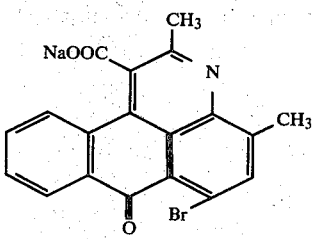

The polymeric dye obtained had the formula:

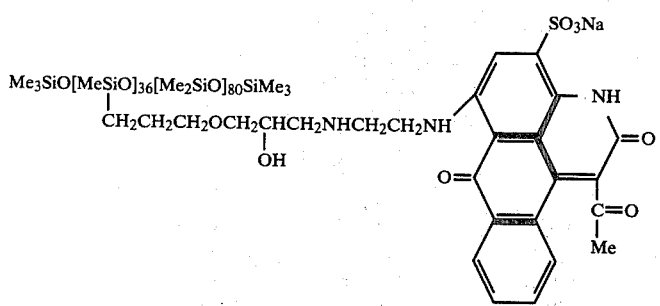

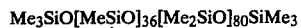
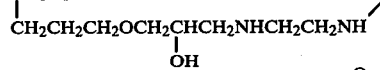
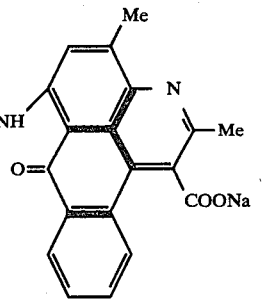

It was a dark brown powder. In water, it gave either a clear orange solution or a bright yellow solution depending upon its concentration.

EXAMPLE VI

A polysiloxane polymer of the formula:

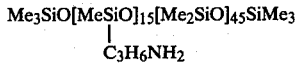

was prepared by a base-catalyzed equilibration between 15 parts of an allyamine-derived cyclic siloxane compound of the formula:

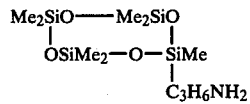

with one part of a compound of the formula Me₃Si-OSiMe₃. The resulting polysiloxane polymer was reacted as in Example III with a compound of the formula:

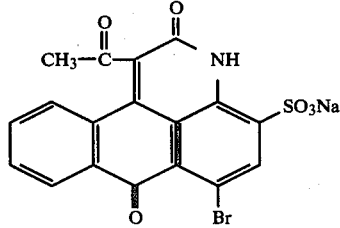

to form a polymeric dye of the formula:

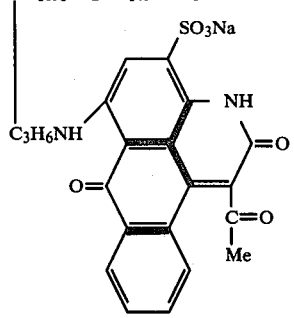

EXAMPLE VII

Into a 3-neck round bottom 100 milliliter flask, fitted with a condensor, a mechanical stirrer, and nitrogen inlet-outlet tubing were added 5.8 grams of a polymer of the formula:

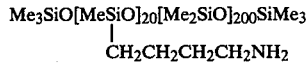

and 5 milliliters each of distilled water and isopropanol, 1.4 milliliters of triethylamine, and a solution made by dissolving 5 grams of Procion red H-3BN, a commercially available reactive dye corresponding to the formula:

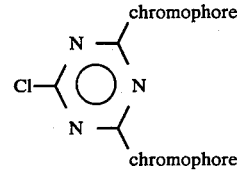

in 35 milliliters of distilled water and 17 milliliters of isopropanol. The milliliters of isopropanol. The mixture was heated at refluxing temperature for 5 hours. After cooling, the mixture was extracted with benzene, the benzene extracts were washed with water, and the benzene was removed. A rubbery dark red polymeric dye of the following formula was obtained.

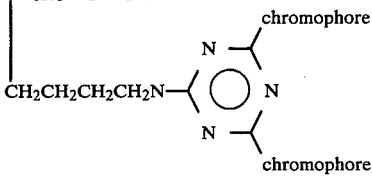

What is claimed is:
1. A polymeric dye of the formula:

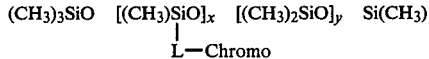

wherein x ranges from 2 to 100, y ranges from 20 to 300, the ratio of x:y is at least 1:10, L is a divalent unsaturated aliphatic linkage which connects the silicon atom to Chromo by non-hydrolyzable covalent bonds, and Chromo is an aromatic chromophoric radical derived from either azo or anthrone dyes and wherein the molecular weight of the polymeric dye is from 200 to 50,000.

2. A polymeric dye as in claim 1 wherein the ratio of x:y is in the range of from 1:5 to 1:1.

3. A polymeric dye as in claim 1 wherein L comprises a linkage of the formula —CH$_2$—R—N— wherein R is CH$_2$CH$_2$OCH$_2$CH(OH)CH$_2$.

4. The polymeric dye of claim 1 wherein the molecular weight is in the range of 1000 to 10,000.

5. A polymeric dye of the formula:

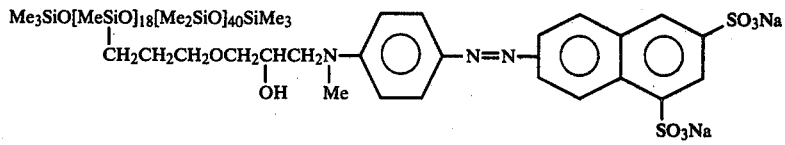

6. A polymeric dye of the formula:

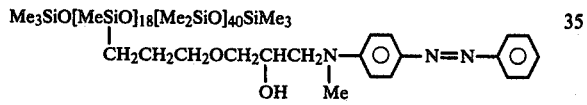

7. A polymeric dye of the formula:

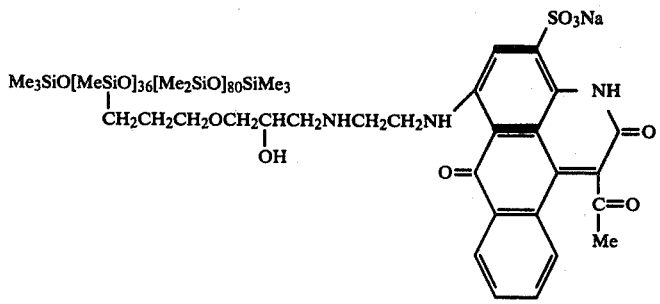

8. A polymeric dye of the formula:

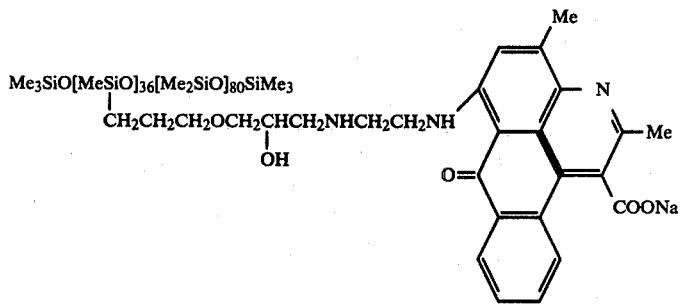

9. A polymeric dye of the formula:

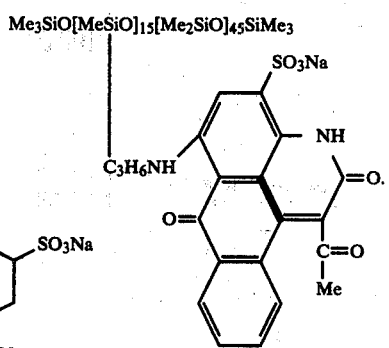

* * * * *